(12) United States Patent
Ohguri (10) Patent No.: US 10,466,373 B2
(45) Date of Patent: Nov. 5, 2019

(54) RADIATION IMAGING APPARATUS AND RADIATION IMAGING SYSTEM

(71) Applicant: CANON KABUSHIKI KAISHA, Tokyo (JP)

(72) Inventor: Hirokazu Ohguri, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 541 days.

(21) Appl. No.: 15/169,888

(22) Filed: Jun. 1, 2016

(65) Prior Publication Data

US 2016/0363675 A1 Dec. 15, 2016

(30) Foreign Application Priority Data

Jun. 15, 2015 (JP) ................................. 2015-120551

(51) Int. Cl.
*G01T 1/16* (2006.01)
*H04N 5/32* (2006.01)
*H04N 5/367* (2011.01)
*G01T 7/00* (2006.01)
*H04N 5/365* (2011.01)

(52) U.S. Cl.
CPC ............... *G01T 7/005* (2013.01); *H04N 5/32* (2013.01); *H04N 5/3651* (2013.01); *G01T 1/16* (2013.01); *H04N 5/367* (2013.01)

(58) Field of Classification Search
CPC ........ H04N 5/32; H04N 5/3651; H04N 5/367; G01T 7/005; G01T 1/16
See application file for complete search history.

(56) References Cited

U.S. PATENT DOCUMENTS

| 6,201,249 | B1* | 3/2001 | Yamayoshi | A61B 6/00 250/370.09 |
| 2003/0126019 | A1* | 7/2003 | Taylor | G06Q 20/202 705/21 |
| 2007/0086563 | A1* | 4/2007 | Bruder | A61B 6/032 378/8 |
| 2010/0115187 | A1* | 5/2010 | Wu | G06F 12/0246 711/103 |
| 2011/0317054 | A1* | 12/2011 | Kameshima | A61B 6/032 348/302 |
| 2014/0133637 | A1* | 5/2014 | Katsumata | A61B 6/585 378/207 |

FOREIGN PATENT DOCUMENTS

JP H11-113889 4/1999

* cited by examiner

*Primary Examiner* — Gregory J Toatley, Jr.
*Assistant Examiner* — Lynda Dinh
(74) *Attorney, Agent, or Firm* — Venable LLP (57) ABSTRACT

A radiation imaging apparatus includes a non-volatile storage unit and a radiation sensor unit which performs imaging on the intensity distribution of radiation irradiation from a radiation source. The non-volatile storage unit includes the first storage area in which the first sensor characteristic information of the radiation sensor unit obtained based on radiation irradiation from the first radiation source is stored, and the second storage area in which the second sensor characteristic information of the radiation sensor unit obtained after the first sensor characteristic information based on radiation irradiation from the second radiation source different from the first radiation source is stored.

10 Claims, 8 Drawing Sheets

RADIATION IMAGING APPARATUS AND RADIATION IMAGING SYSTEM

CROSS-REFERENCE TO RELATED APPLICATIONS

This application claims the benefit of Japanese Patent Application No.2015-120551, filed Jun. 15, 2015, which is hereby incorporated by reference herein in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING" Not Applicable

STSTEMENT REGARDING PRIOR DISCLOSURE BY THE INVENTOR OR A JOINT INVENTOR

Not Applicable

BACKGROUND OF THE INVENTION

Field of the Invention

The present invention relates to a radiation imaging apparatus and a radiation imaging system each obtaining, as an image, the intensity distribution of radiation that has transmitted through an object.

Description of the Related Art

Conventionally, a radiation imaging system has been commercialized, which irradiates an object with radiation from a radiation irradiation source, digitizes a radiation image as the intensity distribution of the radiation that has transmitted through the object, and generates a clearer radiation image by performing required image processing. In such a radiation imaging system, synchronous communication is performed between a radiation imaging apparatus and a radiation generation apparatus, and the radiation imaging apparatus transfers obtained radiation image data to an image processing apparatus such as a personal computer for image processing or saving. The image processing apparatus causes a display apparatus such as a display to display the radiation image data that has undergone the image processing.

On the other hand, when radiation imaging apparatuses capture radiation images, individual characteristics of the respective radiation imaging apparatuses need to be corrected. Japanese Patent Laid-Open No. 11-113889 has disclosed an arrangement in which sensor characteristic information such as information (sensitivity correction information) for correcting the sensitivity difference between respective image sensors and defective pixel information is stored in a non-volatile storage unit included in a radiation imaging apparatus. It becomes possible to read out these pieces of information when necessary by storing them in the non-volatile storage unit.

The sensitivity correction information and the defective pixel information may change over time. It is therefore desirable that sensor information is obtained again periodically and the newly obtained information is stored in the non-volatile storage unit. In this case, if only the latest information is always stored, a case may occur in which a correct image cannot be obtained when the newly obtained information has some defect.

The present invention provides a technique capable of storing the first sensor characteristic information of a radiation sensor unit obtained based on radiation irradiation from the first radiation source and the second sensor characteristic information obtained after the first sensor characteristic information based on radiation irradiation from the second radiation source different from the first radiation source such that the first sensor characteristic information can be used when the second sensor characteristic information has some problem.

BRIEF SUMMARY OF THE INVENTION

According to one aspect of the present invention, there is provided a radiation imaging apparatus comprising a non-volatile storage unit and a radiation sensor unit configured to perform imaging on an intensity distribution of radiation irradiation from a radiation source, the non-volatile storage unit comprising: a first storage area in which first sensor characteristic information of the radiation sensor unit obtained based on radiation irradiation from a first radiation source is stored; and a second storage area in which second sensor characteristic information of the radiation sensor unit obtained after the first sensor characteristic information based on radiation irradiation from a second radiation source different from the first radiation source is stored.

According to another aspect of the present invention, there is provided a radiation imaging system comprising a radiation imaging apparatus which includes a non-volatile storage unit and a radiation sensor unit configured to perform imaging on an intensity distribution of radiation, and an image processing apparatus which includes a database configured to store sensor characteristic information of the radiation sensor unit obtained from the radiation imaging apparatus and a management unit configured to manage the database, the non-volatile storage unit comprising: a first storage area in which first sensor characteristic information of the radiation sensor unit obtained based on radiation irradiation from a first radiation source is stored; and a second storage area in which second sensor characteristic information of the radiation sensor unit obtained after the first sensor characteristic information based on radiation irradiation from a second radiation source different from the first radiation source is stored.

According to the present invention, it become possible to store the first sensor characteristic information of a radiation sensor unit obtained based on radiation irradiation from the first radiation source and the second sensor characteristic information obtained after the first sensor characteristic information based on radiation irradiation from the second radiation source different from the first radiation source such that the first sensor characteristic information can be used when the second sensor characteristic information has some problem.

For example, it becomes possible to store sensor characteristic information obtained before shipment of an apparatus and sensor characteristic information obtained after shipment such that the sensor characteristic information before shipment of the apparatus can be used when the sensor characteristic information after shipment has some problem. This makes it possible to perform processing of an image that has been captured by using the sensor characteristic information obtained before shipment when the sensor characteristic information obtained after shipment has some problem.

Further features of the present invention will become apparent from the following description of exemplary embodiments (with reference to the attached drawings).

DETAILED DESCRIPTION OF THE INVENTION

An embodiment of the present invention will exemplarily be described in detail below with reference to the accompanying drawings. Note that the constituent elements described in this embodiment are merely examples. The technical scope of the present invention is determined by the scope of claims and is not limited by the following individual embodiments.

Figure 1:
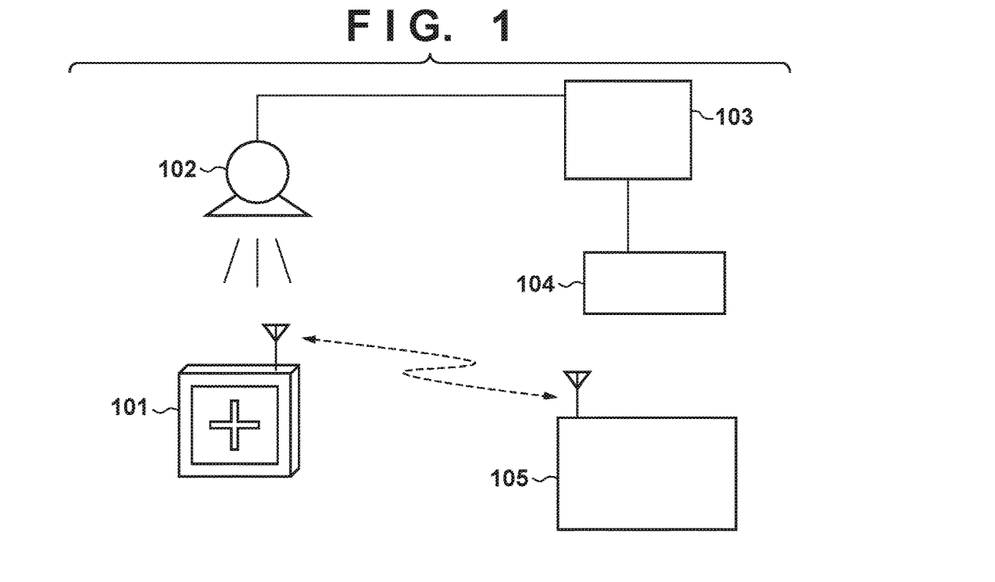
FIG. 1 is a diagram showing an example of the arrangement of a radiation imaging system according to an embodiment.

FIG. 1 is a diagram showing an example of the arrangement of a radiation imaging system according to an embodiment of the present invention. The radiation imaging system includes a radiation imaging apparatus that includes a non-volatile storage unit and a radiation sensor unit which performs imaging on the intensity distribution of radiation, and an image processing apparatus that includes a database which stores sensor characteristic information of the radiation sensor unit obtained from the radiation imaging apparatus and a management unit which manages the database. More specifically, the radiation imaging system of this embodiment includes a radiation imaging apparatus 101, a radiation tube 102, a radiation generation apparatus 103, a control apparatus 104, and an image processing apparatus 105. The radiation imaging apparatus 101 of this embodiment incorporates a wireless transmission/reception apparatus (wireless communication apparatus) and can perform wireless communication with an external apparatus. The radiation tube 102 is installed relatively to the radiation imaging apparatus 101. When capturing the radiation image of a person to be captured, that person is positioned between the radiation tube 102 and the radiation imaging apparatus 101. The control apparatus 104 controls the radiation generation apparatus 103. Note that in this embodiment, radiation is not limited to only X-rays but includes beams such as α-rays, β-rays, and γ-rays which generate particles (including photons) emitted by radiation destruction, and beams having similar energies, such as particle rays and cosmic rays.

Figure 2:
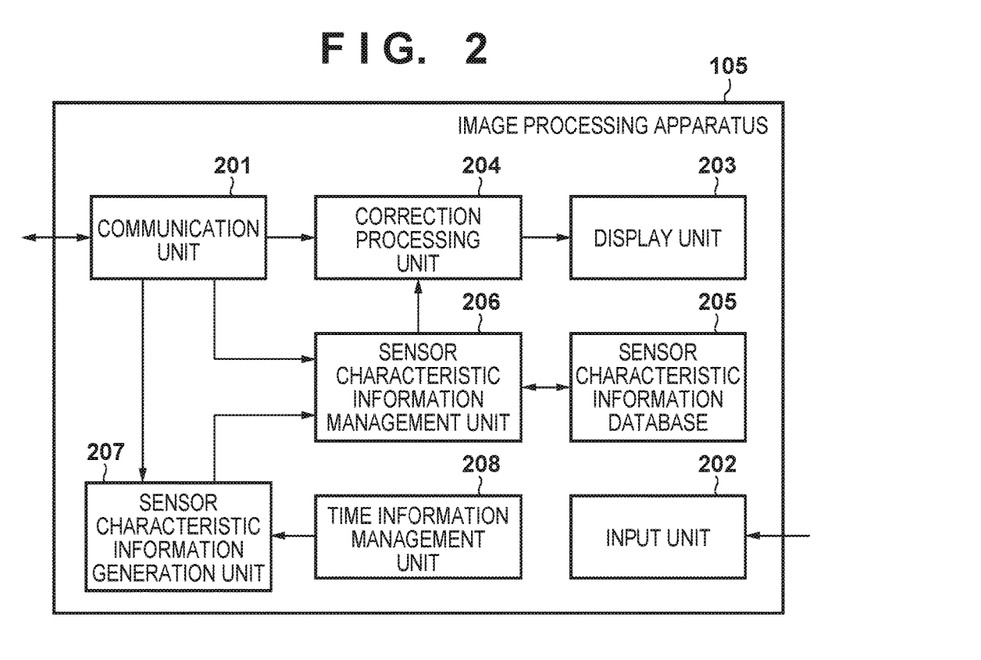
FIG. 2 is a block diagram showing an example of the arrangement of an image processing apparatus according to the embodiment.

FIG. 2 is a block diagram showing an example of the arrangement of the image processing apparatus 105 according to this embodiment. The image processing apparatus 105 incorporates a communication unit 201 capable of wireless transmission/reception and can perform wireless communication with the external apparatus. A desktop personal computer (information processing apparatus) is generally used for the image processing apparatus 105. However, a notebook or tablet personal computer (information processing apparatus) or the like may be used as long as it has a functional arrangement as an image processing apparatus. The image processing apparatus 105 includes an input unit 202 and a display unit 203. A user can obtain an operation instruction to the radiation imaging apparatus 101 and state information of the radiation imaging apparatus 101 via these units. The image processing apparatus 105 further includes a correction processing unit 204 which performs correction processing on an image received from the radiation imaging apparatus 101. The image processing apparatus 105 also includes a sensor characteristic information database 205 (sensor characteristic information storage unit) which stores sensor characteristic information used for the correction processing, and a sensor characteristic information management unit 206 which performs a search within the sensor characteristic information database 205, management of the obtained sensor characteristic information, and the like. The sensor characteristic information database 205 can store a plurality of pieces of sensor characteristic information containing information different in generation time. A sensor characteristic information generation unit 207 and time information management unit 208 generate the sensor characteristic information.

In addition to these functions, the image processing apparatus 105 can, for example, display an image that has undergone the correction processing on the display unit 203 or transfer the image to another server or the like. The radiation imaging apparatus 101 and the image processing apparatus 105 can exchange information and transmit/receive data via a wireless communication interface of the communication unit 201. Communication between the radiation imaging apparatus 101 and the image processing apparatus 105 may be performed via a wireless access point or the like, or may be performed in wired connection using a physical cable.

Figure 3:
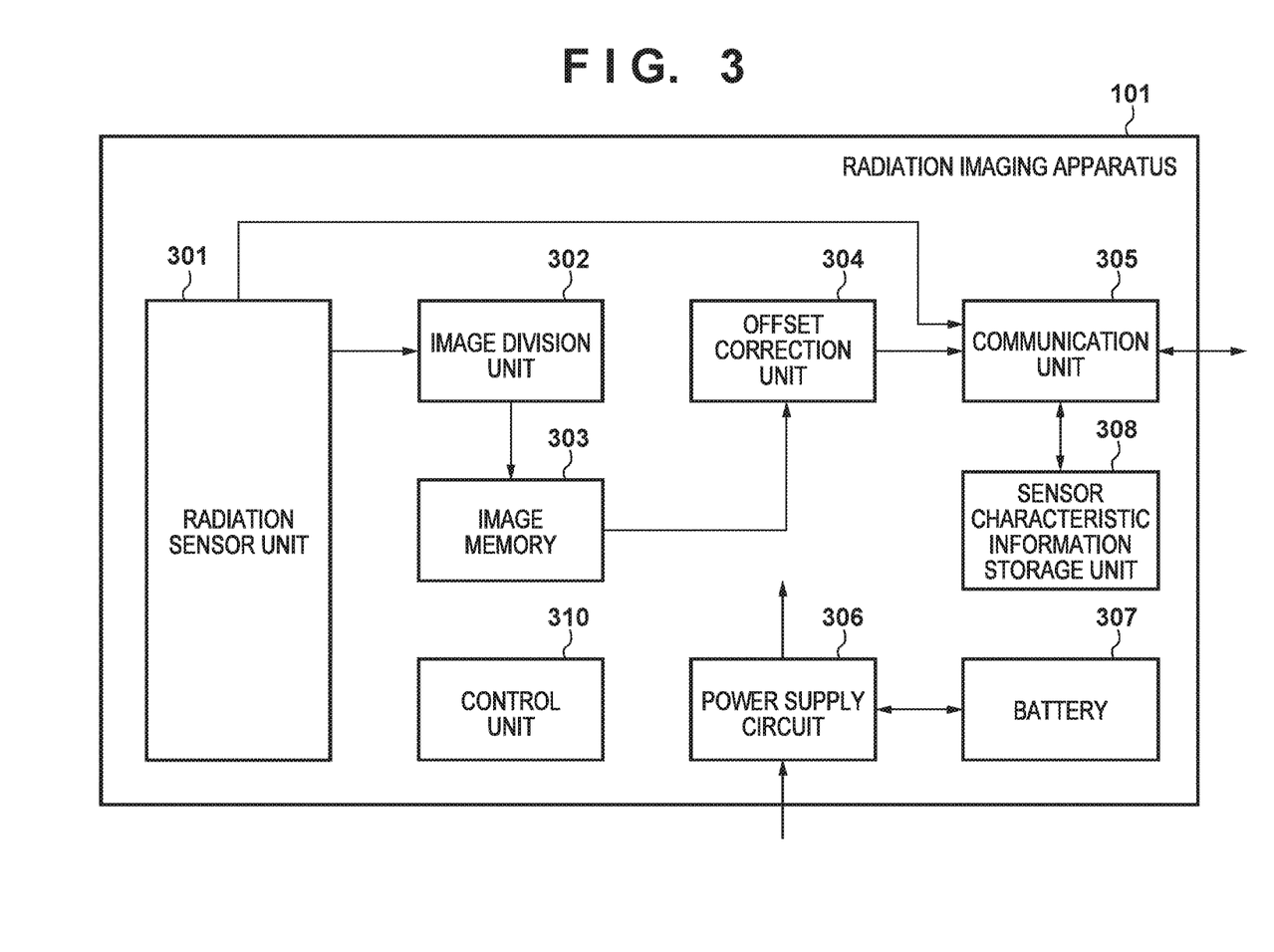
FIG. 3 is a block diagram showing an example of the arrangement of a radiation imaging apparatus according to the embodiment.

FIG. 3 is a block diagram showing an example of the arrangement of the radiation imaging apparatus according to this embodiment. The radiation imaging apparatus 101 of this embodiment includes a non-volatile storage unit and a radiation sensor unit which performs imaging on the intensity distribution of radiation. The non-volatile storage unit includes the first storage area in which the first sensor characteristic information of the radiation sensor unit obtained based on radiation irradiation from the first radiation source is stored. The non-volatile storage unit also includes the second storage area in which the second sensor characteristic information of the radiation sensor unit obtained after the first sensor characteristic information based on radiation irradiation from the second radiation source different from the first radiation source is stored. That is, the non-volatile storage unit includes the first storage area in which sensor characteristic information of the radiation sensor unit obtained before shipment of the radiation imaging apparatus is stored and the second storage area in which sensor characteristic information of the radiation sensor unit obtained after shipment of the radiation imaging apparatus is stored. The non-volatile storage unit can store, as the first sensor characteristic information, the sensor characteristic information of the radiation sensor unit obtained before shipment of the radiation imaging apparatus in the first storage area and store, as the second sensor characteristic information, the sensor characteristic information of the radiation sensor unit obtained after shipment of the radiation imaging apparatus in the second storage area.

As a detailed arrangement, the radiation imaging apparatus 101 includes a radiation sensor unit 301, an image division unit 302, an image memory 303, an offset correction unit 304, a communication unit 305, a power supply circuit 306, a battery 307, a sensor characteristic information storage unit 308 (non-volatile storage unit), and a control unit 310. The control unit 310 can control the operations of the respective units of the radiation imaging apparatus 101 as a whole.

In the radiation sensor unit 301, pixels each including a photoelectric conversion element and a TFT are arranged in a matrix. The radiation sensor unit 301 includes a scan unit which drives them, a readout unit which reads out charges from the TFT to convert them into pixel data, and a sensor control unit which controls the scan unit and the readout unit.

Image data output from the radiation sensor unit 301 is divided into a plurality of reduced images by the image division unit 302. The reduced images divided by the image division unit 302 are temporarily saved in the image memory 303. The image memory 303 saves a plurality of reduced radiation images obtained by dividing an image obtained by radiation irradiation and a plurality of reduced offset images obtained by dividing an image obtained without radiation irradiation. Hence, the image memory 303 has a capacity capable of at least holding them at the same time. For the image memory 303, for example, a volatile memory having a fast access speed such as a DRAM (Dynamic Random Access Memory) is often used, but a non-volatile memory such as a flash memory can also be used.

The offset correction unit 304 performs offset correction processing by reading out the reduced radiation images and the reduced offset images from the image memory 303, and performing a subtraction between the corresponding reduced images. The communication unit 305 transmits, to the image processing apparatus 105, the image which has undergone the offset correction processing. The communication unit 305 includes a wireless communication interface, a wired communication interface, and a circuit for switching between these interfaces. The communication unit 305 also includes a cable connection unit for wired communication. In response to a request from an external apparatus such as the image processing apparatus connected communicably with the radiation imaging apparatus, the communication unit 305 can transmit, to the external apparatus, the sensor characteristic information obtained from one of the first storage area and the second storage area of the non-volatile storage unit.

The power supply circuit 306 receives an external power supply voltage externally supplied from the radiation imaging apparatus 101 via a power supply cable (not shown) and supplies power to respective function building components in the radiation imaging apparatus 101. When no external power supply voltage is supplied, power is supplied from the internal detachable battery 307 to the respective function building components. When the external power supply voltage is supplied and the battery 307 is mounted, power is supplied from the external power supply to the respective function building components and the battery 307 is charged. The power supply circuit 306 controls these operations.

The radiation imaging apparatus 101 also includes the sensor characteristic information storage unit 308. The sensor characteristic information storage unit 308 is formed from the non-volatile memory. The non-volatile storage unit (sensor characteristic information storage unit 308) is configured to be detachable from the radiation imaging apparatus. The non-volatile memory can use, for example, a NOR flash memory. The non-volatile memory can also use, for example, a NAND flash memory because it needs to read and write information of magnitude corresponding to image data at a relatively high speed. Further, the non-volatile memory can use a mounting type memory device fixed to a substrate or the like, or can use a detachable portable memory such as a USB (Universal Serial Bus) memory or various memory cards.

Figure 4:
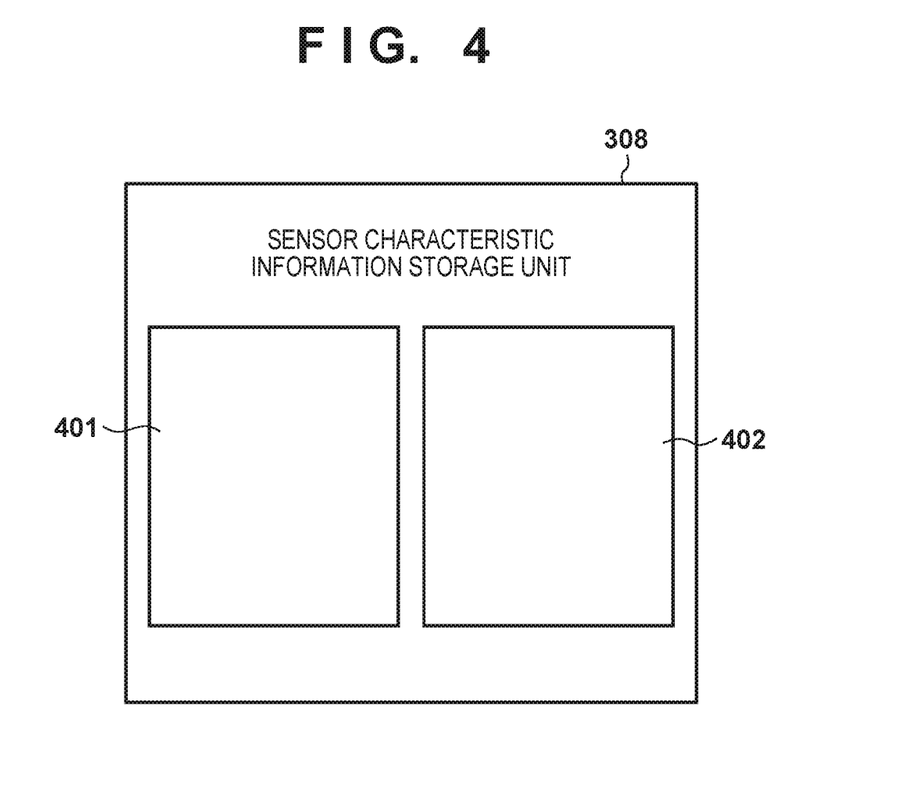
FIG. 4 is a view showing the arrangement of a sensor characteristic information storage unit.

FIG. 4 is a view showing the arrangement of the sensor characteristic information storage unit 308. The sensor characteristic information storage unit 308 includes two storage areas having different application purposes. The non-volatile storage unit (sensor characteristic information storage unit 308) stores the sensor characteristic information of the radiation sensor unit obtained before shipment in the first storage area, and then inhibits the first storage area from overwriting information and erasing the sensor characteristic information stored in the first storage area. Note that a first storage area 401 is an area in which sensor characteristic information obtained in advance in shipment of the radiation imaging apparatus 101 is stored and rewrite is not performed after the sensor characteristic information obtained before shipment is stored. A mechanism that inhibits rewrite may be provided so as not to lose the sensor characteristic information stored in this area.

A second storage area 402 is an area in which sensor characteristic information obtained after shipment of the radiation imaging apparatus 101 is stored. The sensor characteristic information obtained after shipment is stored in this area. That is, the non-volatile storage unit (sensor characteristic information storage unit 308) manages the second storage area such that information can be overwritten, erased, and added, and stores the sensor characteristic information of the radiation sensor unit obtained after shipment in the second storage area. For example, the non-volatile storage area (sensor characteristic information storage unit 308) may overwrite the sensor characteristic information stored in the second storage area each time new sensor characteristic information is obtained. The non-volatile storage area (sensor characteristic information storage unit 308) can also add the latest sensor characteristic information and store a plurality of pieces of sensor characteristic information after securing a capacity capable of storing the plurality of pieces of sensor characteristic information. When the plurality of pieces of sensor characteristic information are stored in the second storage area of the non-volatile storage unit, the radiation imaging apparatus transmits, to the image processing apparatus, the latest time information out of time information for when the plurality of pieces of sensor characteristic information have been generated if no designation is given from the image processing apparatus. At this time, the image processing apparatus can obtain, from the radiation imaging apparatus, the latest time information out of the time information for when the plurality of pieces of sensor characteristic information have been generated.

The sensor characteristic information of the radiation sensor unit stored in the non-volatile storage unit (sensor characteristic information storage unit 308) is associated with the time information time for when the sensor characteristic information has been generated on a one-to-one basis. That is, all the sensor characteristic information stored in the sensor characteristic information storage unit 308 is stored linked with the time information for when they have been generated. The time information may be configured to be stored in the sensor characteristic information storage unit 308 in addition to the sensor characteristic information or may be configured to be linked with the corresponding sensor characteristic information after another non-volatile storage unit stores the time information itself. Further, the time information may not indicate time complying with real time, but can be information capable of uniquely deciding the time-axis relationship between the generation times of the plurality of pieces of sensor characteristic information.

The sensor characteristic information is information for correcting an image defect caused owing to the characteristics of the radiation sensor unit 301. This information is unique to each of the individual radiation sensor units. The sensor characteristic information of the radiation sensor unit stored in the non-volatile storage unit contains at least one of gain correction information for correcting the gain difference between the pixels and defect information for correcting the defective pixel. The sensor characteristic information also contains, for example, information for correcting the gain difference, the offset difference, or the like for each of the readout units. In this embodiment, an example will be described in which the sensor characteristic information is the gain correction information for correcting the gain difference for each pixel.

Figure 5:
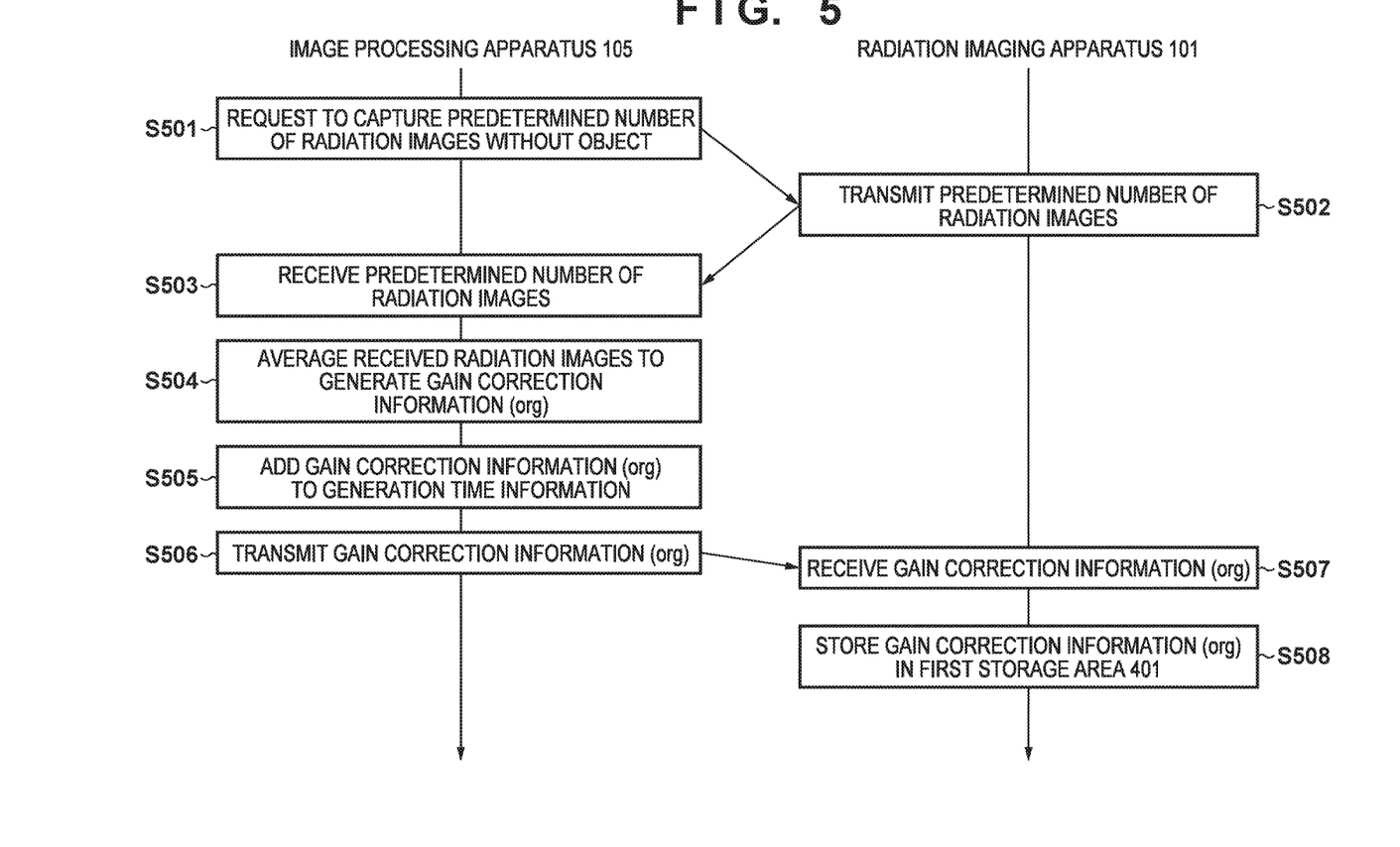
FIG. 5 is a timing chart showing a procedure for generating sensor characteristic information before shipment.

FIG. 5 is a timing chart showing a procedure for storing, in the sensor characteristic information storage unit 308, the gain correction information for correcting the gain difference for each pixel when the radiation imaging apparatus 101 is shipped. The gain correction information stored at this time will be called gain correction information (org).

The gain correction information (org) is generated in steps S501 to S504. The gain correction information (org) is generated by causing the image processing apparatus to obtain, from the radiation imaging apparatus 101, a predetermined number of radiation images irradiated with radiation from the radiation tube 102 without arranging an object for the radiation imaging apparatus 101 and to average those obtained images. Radiation irradiation is performed such that the entire surface of the radiation imaging apparatus 101 is irradiated with radiation of a uniform dose.

More specifically, in step S501, the image processing apparatus 105 requests the radiation imaging apparatus 101 to capture the predetermined number of radiation images without the object. Upon receiving this request, in step S502, the radiation imaging apparatus 101 captures the predetermined number of radiation images and transmits them to the image processing apparatus 105. In step S503, the image processing apparatus 105 receives the predetermined number of radiation images. Then, in step S504, the image processing apparatus 105 averages the received radiation images to generate the gain correction information (org).

Next, in step S505, the image processing apparatus 105 adds information (generation time information) indicating generation time to the generated gain correction information (org). Then, in step S506, the image processing apparatus 105 transmits the gain correction information (org) to which the generation time information has been added from the image processing apparatus 105 to the radiation imaging apparatus 101. In step S507, the radiation imaging apparatus 101 receives the gain correction information (org). In step S508, the radiation imaging apparatus 101 stores the received gain correction information (org) in the first storage area 401 of the sensor characteristic information storage unit 308. Then, the radiation imaging apparatus 101 is shipped. Note that the radiation imaging apparatus 101 can set, for the first storage area 401 of the sensor characteristic information storage unit 308, a rewrite inhibition flag in order to inhibit erasure or rewrite.

Note that the radiation imaging apparatus 101 holds unique identification information for identifying its own radiation sensor unit 301. For example, the sensor characteristic information storage unit 308 of the radiation sensor unit 301 itself or another storage unit in the radiation imaging apparatus 101 can be configured to hold the identification information. The image processing apparatus 105 obtains the identification information from the radiation imaging apparatus 101 before transmitting the gain correction information (org) to the radiation imaging apparatus 101. Then, the image processing apparatus 105 combines the gain correction information (org) and the identification information, and transmits them to the radiation imaging apparatus 101. If the identification information of the radiation imaging apparatus 101 and the received identification information are different from each other, the radiation imaging apparatus 101 discards the received gain correction information (org) and notifies the image processing apparatus 105 of this. On the other hand, if the identification information of the radiation imaging apparatus 101 and the received identification information match, the radiation imaging apparatus 101 stores the received gain correction information (org) in the first storage area 401 of the sensor characteristic information storage unit 308.

Figure 6A:
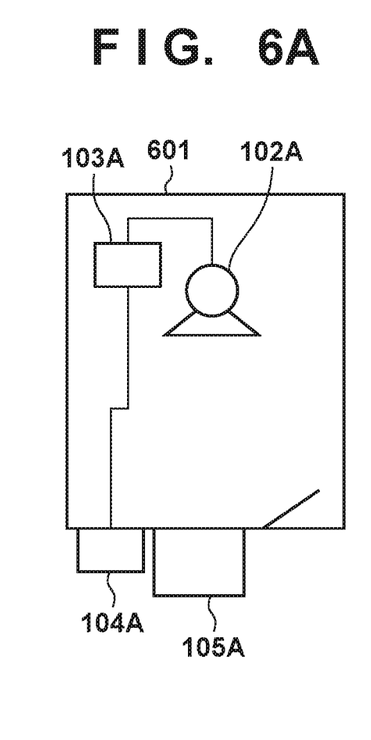
FIGS. 6A, 6B, and 6C are views showing an example of the arrangement of the radiation imaging system.
Figure 6B:
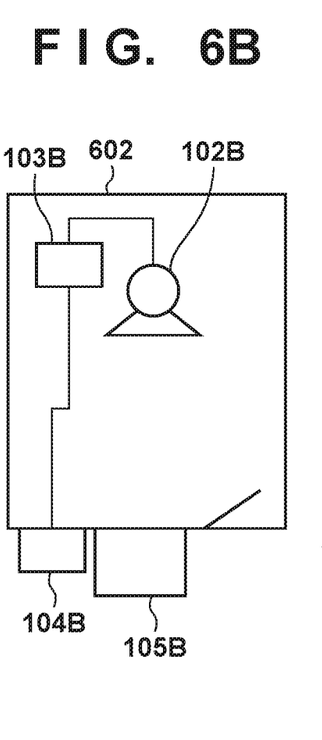
Figure 6C:
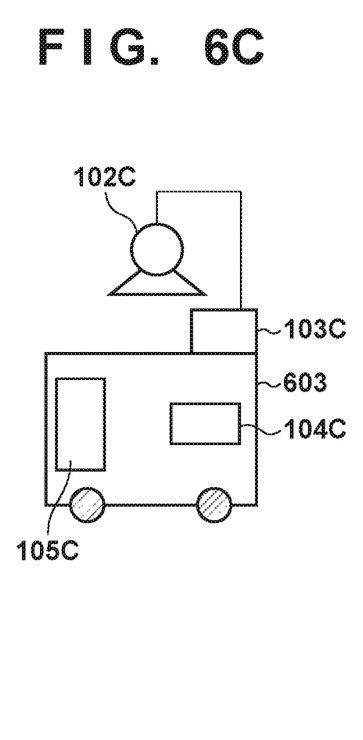

FIGS. 6A to 6C show an example of the arrangement of the radiation imaging system when the shipped radiation imaging apparatus 101 is used in an actual usage environment such as a hospital. A case (FIG. 6A) in which the radiation imaging apparatus 101 is used in a radiation imaging room A denoted by reference numeral 601, a case (FIG. 6B) in which the radiation imaging apparatus 101 is used in a radiation imaging room B denoted by reference numeral 602, and a case (FIG. 6C) in which the radiation imaging apparatus 101 is used in a mobile radiation imaging apparatus 603 will be described in this embodiment. A radiation tube 102A, a radiation generation apparatus 103A, a control apparatus 104A, and an image processing apparatus 105A are installed in the radiation imaging room A. Similarly, a radiation tube 102B, a radiation generation apparatus 103B, a control apparatus 104B, and an image processing apparatus 105B are installed in the radiation imaging room B. Likewise, a radiation tube 102C, a radiation generation apparatus 103C, a control apparatus 104C, and an image processing apparatus 105C are also installed in the mobile radiation imaging apparatus 603.

Figure 7:
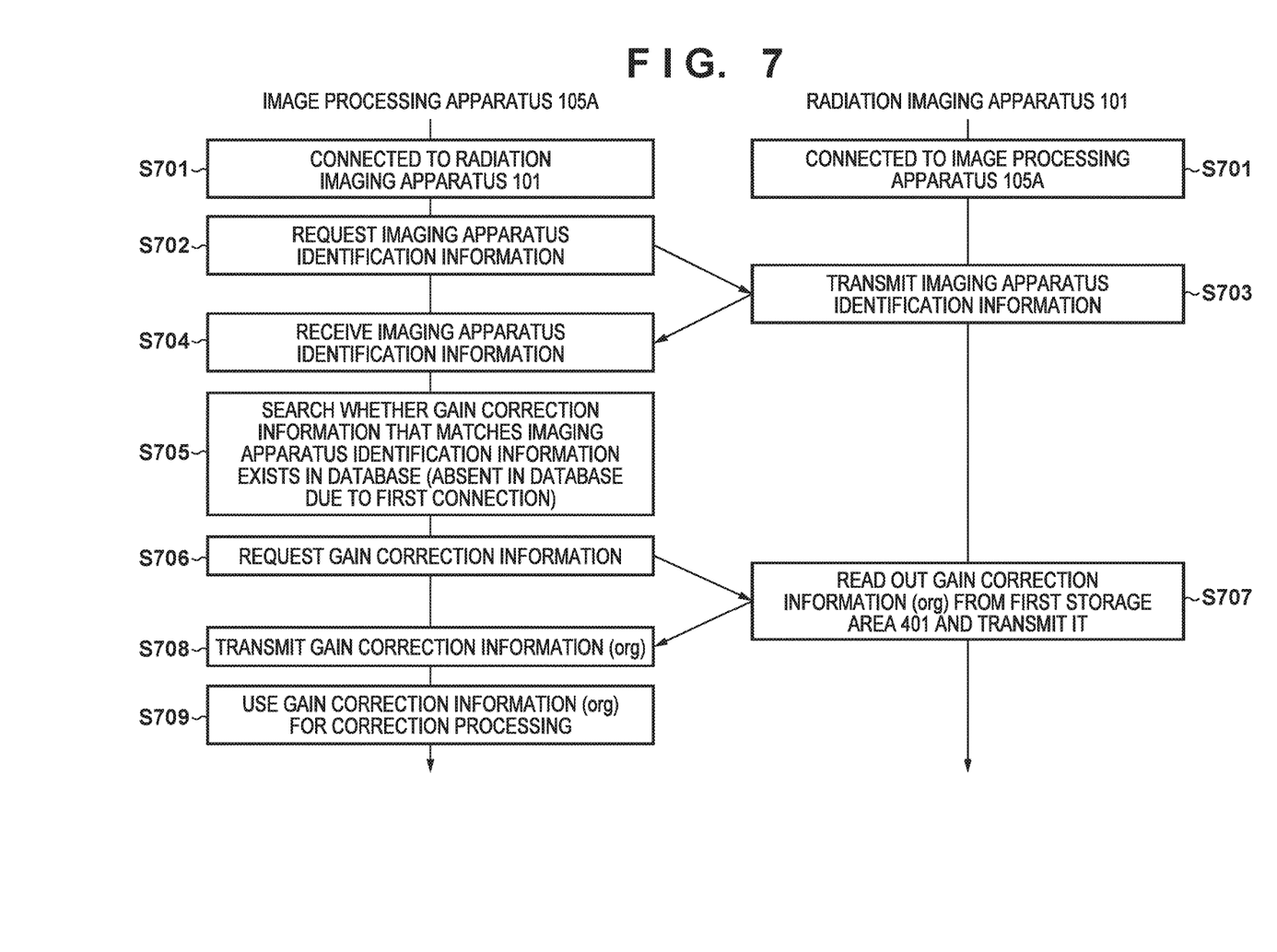
FIG. 7 is a timing chart showing an operation procedure when the radiation imaging apparatus and the image processing apparatus are first connected to each other.

FIG. 7 shows a timing chart when the radiation imaging apparatus 101 is installed in the radiation imaging room A and is first used. In processing shown in FIG. 7, the image processing apparatus 105A obtains the identification information of the radiation imaging apparatus 101 via a communication unit capable of transmitting/receiving data to/from the radiation imaging apparatus 101. Then, the sensor characteristic information management unit 206

(management unit) determines whether the sensor characteristic information of the radiation sensor unit associated with the obtained identification information of the radiation imaging apparatus 101 exists in a database. If the sensor characteristic information management unit 206 (management unit) determines that the sensor characteristic information does not exist in the database, the image processing apparatus 105A obtains, from the radiation imaging apparatus 101, the sensor characteristic information of the radiation sensor unit via the communication unit.

First, in step S701, the image processing apparatus 105A and the radiation imaging apparatus 101 are connected to each other. Connection may be initialized from either of them. The image processing apparatus 105A obtains identification information (imaging apparatus identification information) from the radiation imaging apparatus 101 (steps S702 to S704) when connected to the radiation imaging apparatus 101.

More specifically, in step S702, the image processing apparatus 105A requests the identification information (imaging apparatus identification information) of the radiation imaging apparatus 101. Based on this request, in step S703, the radiation imaging apparatus 101 transmits the identification information (imaging apparatus identification information) to the image processing apparatus 105A as a request source. This identification information is unique information for identifying individual radiation imaging apparatuses. Particularly, this identification information needs to be linked with the unique characteristic of the radiation sensor unit 301, and thus unique information is given to the individual radiation sensor unit 301. Then, in step S704, the image processing apparatus 105A obtains the identification information of the radiation imaging apparatus via the communication unit. That is, the image processing apparatus 105A receives the identification information transmitted from the radiation imaging apparatus 101.

In step S705, the sensor characteristic information management unit 206 (management unit) determines whether the sensor characteristic information of the radiation sensor unit associated with the obtained identification information of the radiation imaging apparatus exists in the database. Then, if the sensor characteristic information management unit 206 (management unit) determines that the sensor characteristic information does not exist in the database, the image processing apparatus 105A obtains, from the radiation imaging apparatus, the sensor characteristic information of the radiation sensor unit via the communication unit. More specifically, the sensor characteristic information management unit 206 of the image processing apparatus 105A searches whether gain correction information (sensor characteristic information) linked with the obtained identification information of the radiation imaging apparatus 101 exists in the sensor characteristic information database 205. Here, due to the first connection, the gain correction information linked with the identification information (imaging apparatus identification information) does not exist in the sensor characteristic information database 205.

Therefore, the image processing apparatus 105A obtains the gain correction information from the radiation imaging apparatus 101 in steps S706 to S708. More specifically, in step S706, the image processing apparatus 105A requests the gain correction information of the radiation imaging apparatus 101. Based on this request, in step S707, the radiation imaging apparatus 101 reads out the gain correction information (org) from the first storage area 401 of the sensor characteristic information storage unit 308 and transmits it to the image processing apparatus 105A. In step S708, the image processing apparatus 105A receives the gain correction information (org) transmitted from the radiation imaging apparatus 101.

Then, in step S709, the image processing apparatus 105A uses the received gain correction information (org) for gain correction processing.

Likewise, the same procedure as in FIG. 7 is also performed in the cases in which the radiation imaging apparatus 101 is first used in the radiation imaging room B and the mobile radiation imaging apparatus 603. In each case, gain correction processing is performed by using the gain correction information (org).

A method of gain correction processing is well known, and thus a detail thereof will not be described here. However, the method can be achieved simply by a division of the radiation image and the gain correction information. The gain correction information may change over time, by energizing time to the radiation sensor unit, or the like. It is therefore desirable that new gain correction information is obtained periodically after the radiation imaging apparatus 101 is installed.

Figure 8:
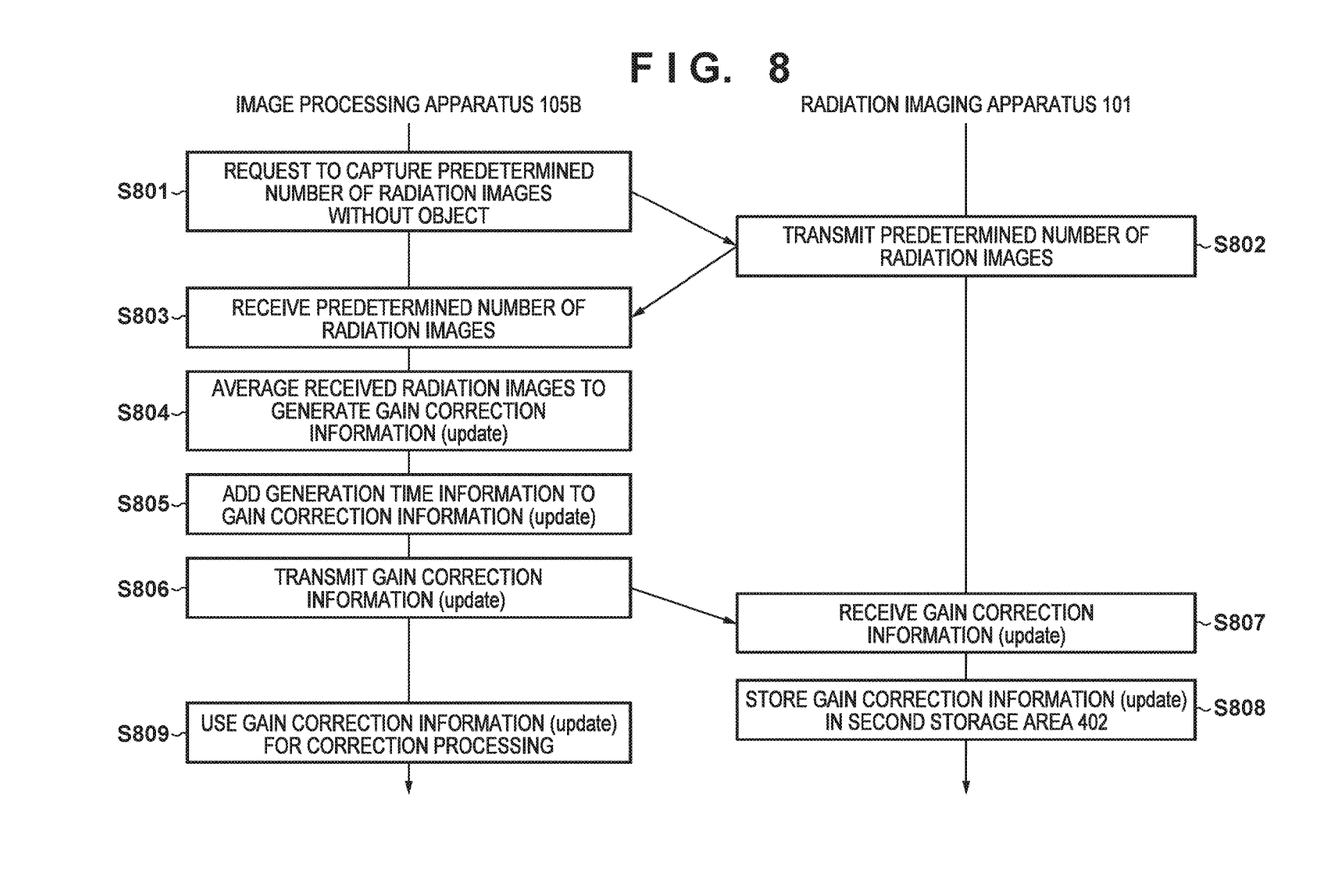
FIG. 8 is a timing chart showing a procedure for generating sensor characteristic information after shipment.

FIG. 8 is a timing chart showing a procedure in a case in which this periodic update of the gain correction information is performed when the radiation imaging apparatus 101 is used in the radiation imaging room B. Note that the image processing apparatus may notify, based on information of the use time or the use count of the radiation imaging apparatus, a need to update the gain correction information of a serviceman or the user.

When the gain correction information of the radiation imaging apparatus 101 needs updating, the image processing apparatus 105B generates gain correction information (update) to which the generation time information is added in a procedure of steps S801 to S805.

More specifically, in step S801, the image processing apparatus 105B requests the radiation imaging apparatus 101 to capture a predetermined number of radiation images without the object. Upon receiving this request, in step S802, the radiation imaging apparatus 101 captures the predetermined number of radiation images and transmits them to the image processing apparatus 105B. In step S803, the image processing apparatus 105B receives the predetermined number of radiation images. Then, in step S804, the image processing apparatus 105B averages the received radiation images to generate the gain correction information (update).

Next, in step S805, the image processing apparatus 105B adds information (generation time information) indicating generation time to the generated gain correction information (update). Then, in step S806, the image processing apparatus 105B transmits the gain correction information (update) to which the generation time information has been added from the image processing apparatus 105B to the radiation imaging apparatus 101.

In step S807, the radiation imaging apparatus 101 receives the gain correction information (update). In step S808, the radiation imaging apparatus 101 stores the received gain correction information (update) in the second storage area 402 of the sensor characteristic information storage unit 308.

In step S809, the image processing apparatus 105B uses the gain correction information (update) from the next gain correction processing. When the image processing apparatus generates and updates the gain correction information afterward, the radiation imaging apparatus 101 stores all the newly generated gain correction information in the second storage area 402 of the sensor characteristic information storage unit 308. In the second storage area 402, the old gain correction information may be rewritten with the newly generated gain correction information each time or a capacity capable of storing a plurality of pieces of gain correction information in the second storage area 402 may be given.

Figure 9:
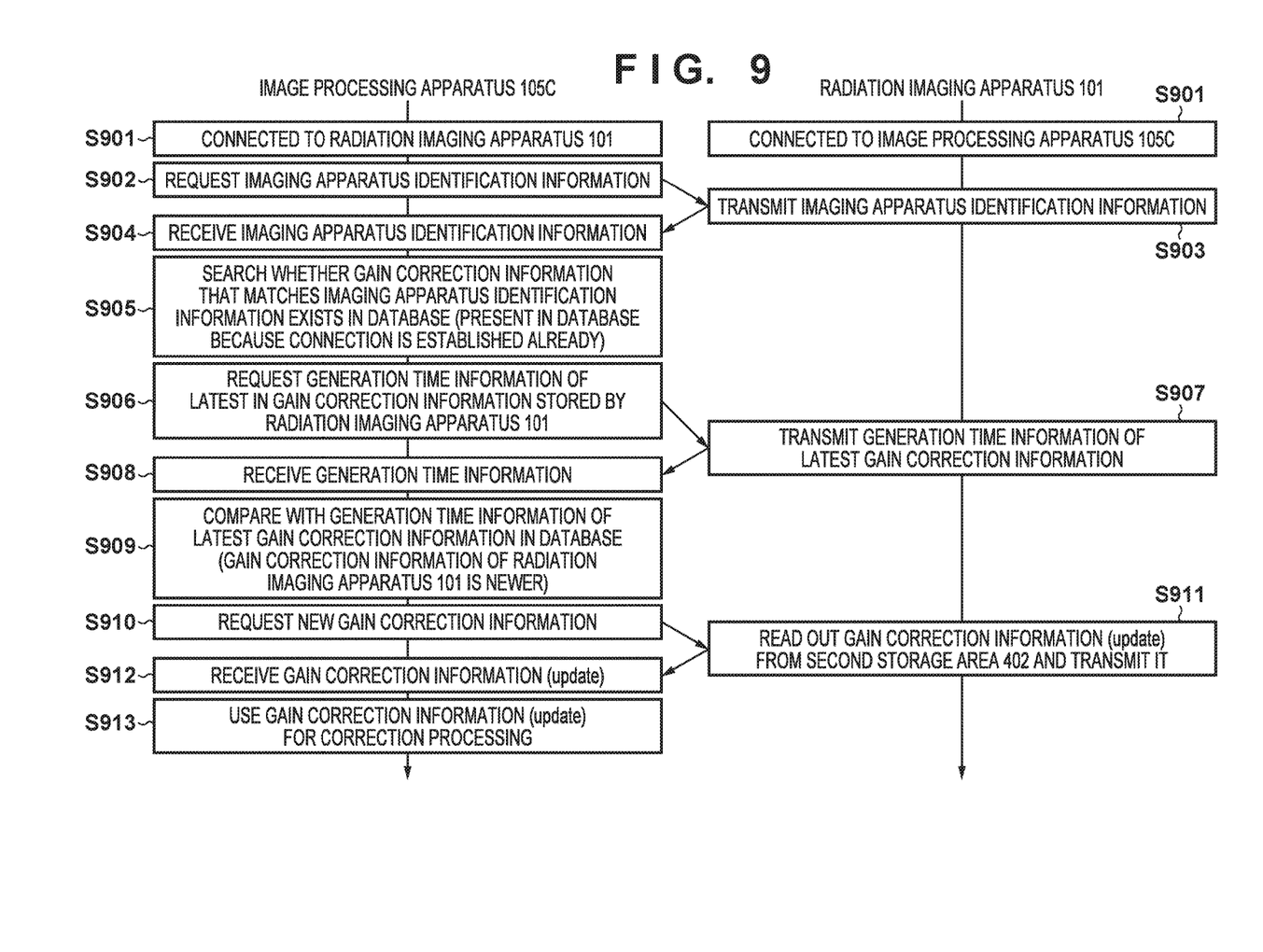
FIG. 9 is a timing chart showing an operation procedure when the radiation imaging apparatus and the image processing apparatus are first connected to each other after the sensor characteristic information is generated after shipment.

Next, FIG. 9 shows a procedure in a case in which the radiation imaging apparatus 101 containing the gain correction information (update) stored in the second storage area 402 of the sensor characteristic information storage unit 308 is first used in the mobile radiation imaging apparatus 603. In processing shown in FIG. 9, the image processing apparatus 105C obtains the identification information of the radiation imaging apparatus 101 via a communication unit capable of transmitting/receiving data to/from the radiation imaging apparatus 101. Then, the sensor characteristic information management unit 206 (management unit) determines whether sensor characteristic information of the radiation sensor unit associated with the obtained identification information of the radiation imaging apparatus 101 exists in a database. If the sensor characteristic information management unit 206 (management unit) determines that the sensor characteristic information of the radiation sensor unit associated with the obtained identification information of the radiation imaging apparatus exists in the database, the image processing apparatus 105C obtains, from the radiation imaging apparatus via the communication unit, time information for when the sensor characteristic information of the radiation sensor unit has been generated. Then, if the sensor characteristic information management unit 206 determines that the obtained time information indicates a newer time than the time information for when the sensor characteristic information that exists in the database has been generated, the image processing apparatus 105C obtains, from the radiation imaging apparatus 101 via the communication unit 201, the sensor characteristic information of the radiation sensor unit corresponding to the time information obtained.

More specifically, after the radiation imaging apparatus 101 and the image processing apparatus 105C are connected to each other in step S901, the image processing apparatus 105C obtains identification information (imaging apparatus identification information) of the radiation imaging apparatus 101 in steps S902 to S904.

In step S902, the image processing apparatus 105C requests the identification information (imaging apparatus identification information) of the radiation imaging apparatus 101. Based on this request, in step S903, the radiation imaging apparatus 101 transmits the identification information (imaging apparatus identification information) to the image processing apparatus 105C as a request source. Then, in step S904, the image processing apparatus 105C receives the identification information (imaging apparatus identification information) transmitted from the radiation imaging apparatus 101.

In step S905, the sensor characteristic information management unit 206 of the image processing apparatus 105C searches whether gain correction information linked with the obtained identification information (imaging apparatus identification information) of the radiation imaging apparatus 101 exists in the sensor characteristic information database 205. As a result of searching, by the sensor characteristic information management unit 206, the database based on the identification information (imaging apparatus identification information) in step S905, the gain correction information (org) is already obtained. Therefore, next in step S906, the image processing apparatus 105C requests, from the radiation imaging apparatus 101, information (generation time information) of time at which the sensor characteristic information of the radiation sensor unit has been generated via the communication unit. That is, the image processing apparatus 105C requests generation time information of the latest in the gain correction information stored by the radiation imaging apparatus 101.

Next, in step S907, the radiation imaging apparatus 101 that has received the request transmits, to the image processing apparatus 105C, the generation time information of the latest gain correction information. In this case, the gain correction information (update) stored in the second storage area 402 of the sensor characteristic information storage unit 308 is the latest gain correction information, and thus the radiation imaging apparatus 101 transmits this generation time information to the image processing apparatus 105C.

In step S908, the image processing apparatus 105C obtains, from the radiation imaging apparatus via the communication unit, the information (generation time information) of the time at which the sensor characteristic information of the radiation sensor unit has been generated. That is, the image processing apparatus 105C receives the generation time information transmitted from the radiation imaging apparatus 101. Then, in step S909, the image processing apparatus 105C compares this with the generation time information of its own gain correction information (org). As a result, it is determined that the radiation imaging apparatus 101 stores the gain correction information newer than the gain correction information (org). Then, the image processing apparatus 105C requests the new gain correction information of the radiation imaging apparatus 101 and obtains the gain correction information (update) (steps S910 to S912).

More specifically, in step S910, the image processing apparatus 105C requests the gain correction information of the radiation imaging apparatus 101. Based on this request, in step S911, the radiation imaging apparatus 101 reads out the gain correction information (update) from the second storage area 402 of the sensor characteristic information storage unit 308 and transmits it to the image processing apparatus 105C. In step S912, the image processing apparatus 105C receives the gain correction information (update) transmitted from the radiation imaging apparatus 101.

In step S913, the image processing apparatus 105C uses the gain correction information (update) from the next gain correction processing. A processing flow described with reference to FIG. 9 adopts the same procedure when it is used in the radiation imaging room A. The image processing apparatus 105A can use the gain correction information (update) for the gain correction processing.

For example, when the gain correction information (update) is stored in the second storage area 402 of the sensor characteristic information storage unit 308 at time when one image processing apparatus is first connected to the radiation imaging apparatus 101, the radiation imaging apparatus 101 transmits only the gain correction information (update) to the image processing apparatus. Then, the image processing apparatus performs the gain correction processing by using the gain correction information (update).

The image processing apparatus can display a choice that makes it possible to obtain the gain correction information (update) and use it for the gain correction processing on a GUI (Graphical User Interface) or the like displayed on the display unit 203.

In the processing in step S907 of FIG. 9 described above, the radiation imaging apparatus 101 transmits the generation time information of the latest gain correction information to the image processing apparatus 105C. However, the present invention is not limited to this example. For example, when generation time information of the plurality of pieces of gain correction information is stored in the second storage area 402, the radiation imaging apparatus 101 can transmit the generation time information of the plurality of pieces of gain correction information to the image processing apparatus. As described above, in the case of an arrangement in which the plurality of pieces of gain correction information different in generation time information are stored in the second storage area 402, the image processing apparatus can select which gain correction information is obtained from the choices based on the generation time information on the GUI displayed on the display unit 203.

The detachable sensor characteristic information storage unit 308 (the non-volatile storage unit) stores the identification information of the radiation imaging apparatus in the first storage area 401. If it is determined that the identification information of the radiation imaging apparatus and the identification information stored in the storage unit do not match, the control unit 310 of the radiation imaging apparatus can control the operation of the radiation imaging apparatus so as not to transit to a radiation imaging enable state. The control unit 310 of the radiation imaging apparatus causes a notification unit (for example, an LED) of the radiation imaging apparatus to notify a determination result. The control unit 310 also causes the communication unit 305 of the radiation imaging apparatus to transmit the determination result to the image processing apparatus 105. The display unit 203 of the image processing apparatus 105 can display the determination result transmitted from the radiation imaging apparatus.

When the sensor characteristic information storage unit 308 is a detachable non-volatile memory, a combination can be formed in which the radiation sensor unit 301 and the sensor characteristic information stored in the sensor characteristic information storage unit 308 do not correspond to each other. Therefore, the non-volatile memory stores information for specifying the corresponding radiation sensor unit. This information may be the same as the identification information (imaging apparatus identification information) of the radiation imaging apparatus as long as it can uniquely decide the corresponding radiation sensor unit. If the detachable non-volatile memory with which the identification information for identifying this radiation sensor unit does not match is connected to the radiation imaging apparatus, the radiation imaging apparatus can cause the notification unit such as the LED to display that the identification information of the radiation sensor unit does not match. Further, the radiation imaging apparatus may transmit, to the image processing apparatus 105, information on the determination result indicating that the identification information of the radiation sensor unit does not match and may notify the user of this via the display unit 203 of the image processing apparatus 105. At the same time, the radiation imaging apparatus may leave this in an operation log.

In this embodiment, the arrangement has been described in which the image processing apparatus performs the gain correction processing. However, an arrangement is also possible in which the radiation imaging apparatus performs the gain correction processing. Furthermore, an arrangement is also possible in which the gain correction processing is also performed in the radiation imaging apparatus by arranging the time information management unit 208 of the image processing apparatus 105 in the radiation imaging apparatus 101.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A radiation imaging system comprising:
    a radiation imaging apparatus that includes a non-volatile storage unit and a radiation sensor unit configured to perform imaging on an intensity distribution of radiation; and
    an image processing apparatus that includes a database configured to store sensor characteristic information of the radiation sensor unit obtained from the radiation imaging apparatus, a management unit configured to manage the database and a communication unit configured to transmit or receive data to or from the radiation imaging apparatus, wherein
    the image processing apparatus obtains identification information of the radiation imaging apparatus via the communication unit,
    the sensor characteristic information of the radiation sensor unit is used for correction processing on an image imaged by the radiation sensor unit,
    the non-volatile storage unit stores the sensor characteristic information of the radiation sensor unit associated with, on a one-to-one basis, time information for when the sensor characteristic information has been generated,
    the management unit obtains, from the radiation imaging apparatus, the sensor characteristic information of the radiation sensor unit via the communication unit if the management unit of the image processing apparatus determines that no sensor characteristic information of the radiation sensor unit associated with the obtained identification information of the radiation imaging apparatus exists in the database, and
    the management unit obtains the sensor characteristic information stored in the non-volatile storage if the management unit determines that the time information for when the sensor characteristic information that is stored in the non-volatile storage unit has been generated indicates newer time than the time information for when the sensor characteristic information that exists in the database has been generated.

2. The system according to claim 1, wherein the non-volatile storage unit comprises a first storage area in which first sensor characteristic information of the radiation sensor unit obtained based on radiation irradiation from a first radiation source is stored; and a second storage area in which second sensor characteristic information of the radiation sensor unit obtained after the first sensor characteristic information based on radiation irradiation from a second radiation source different from the first radiation source is stored, wherein the first sensor characteristic information of the radiation sensor unit is obtained before shipment of the radiation imaging apparatus, and the second sensor characteristic information of the radiation sensor unit is obtained after shipment of the radiation imaging apparatus.

3. The system according to claim 2, wherein said first storage area comprises a detachable non-volatile storage unit, and a control unit of the radiation imaging apparatus controls an operation of the radiation imaging apparatus so as not to transit to a radiation imaging enable state if it is determined that the identification information of the radiation imaging apparatus and the identification information stored in the storage unit do not match.

4. The system according to claim 1, wherein the sensor characteristic information of the radiation sensor unit stored in the non-volatile storage unit contains at least one of gain correction information for correcting a gain difference between pixels and defect information for correcting a defective pixel.

5. The system according to claim 1, wherein the non-volatile storage unit stores the sensor characteristic information of the radiation sensor unit in the first storage area, and then inhibits the first storage area from overwriting information and erasing the sensor characteristic information stored in the first storage area.

6. The system according to claim 1, wherein the non-volatile storage unit manages the second storage area permitting overwriting, erasing and adding such information, and storing the second sensor characteristic information in the second storage area.

7. The system according to claim 1, wherein the non-volatile storage unit is detachable from the radiation imaging apparatus.

8. The system according to claim 1, wherein the image processing apparatus obtains, from the radiation imaging apparatus via the communication unit, the time information for when the sensor characteristic information of the radiation sensor unit has been generated if the sensor characteristic information of the radiation sensor unit associated with the obtained identification information of the radiation imaging apparatus exists in the database, and the image processing apparatus obtains sensor characteristic information corresponding to the time information obtained via the communication unit if the management unit determines that the obtained time information indicates newer time than the time information for when the sensor characteristic information that exists in the database has been generated.

9. The system according to claim 8, wherein the image processing apparatus obtains, from the radiation imaging apparatus, latest time information out of the time information for when the plurality of pieces of sensor characteristic information have been generated when a plurality of pieces of sensor characteristic information are stored in the second storage area of the non-volatile storage unit.

10. The system according to claim 8, wherein the database of the image processing apparatus stores the plurality of pieces of sensor characteristic information different in the time information.

* * * * *